W. S. ALLEY.
HEADER BARGE.
APPLICATION FILED MAY 4, 1909.
957,483.
Patented May 10, 1910.
2 SHEETS—SHEET 2.
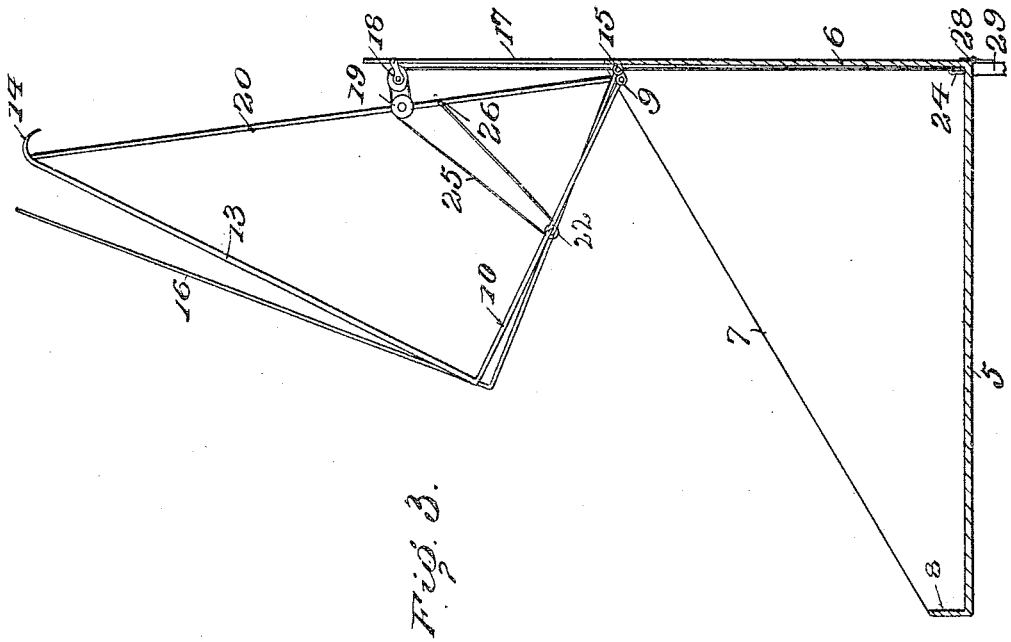
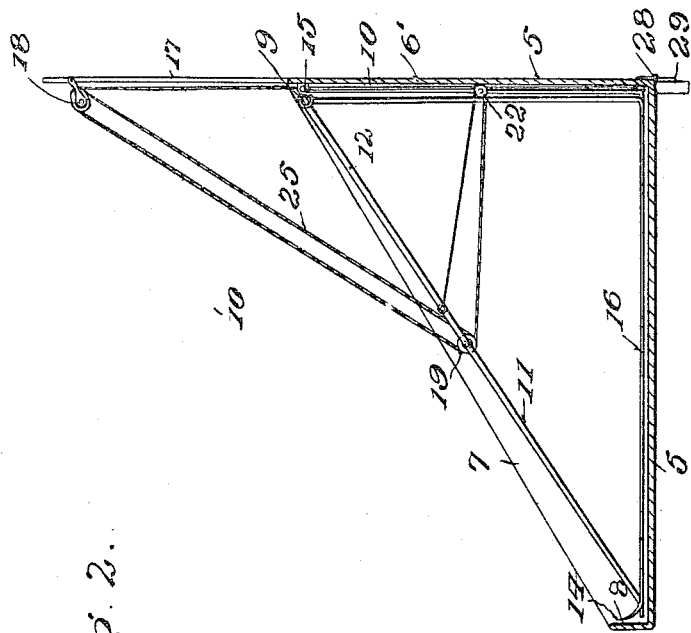
Inventor
W. S. Alley
Witnesses
By
Attorneys

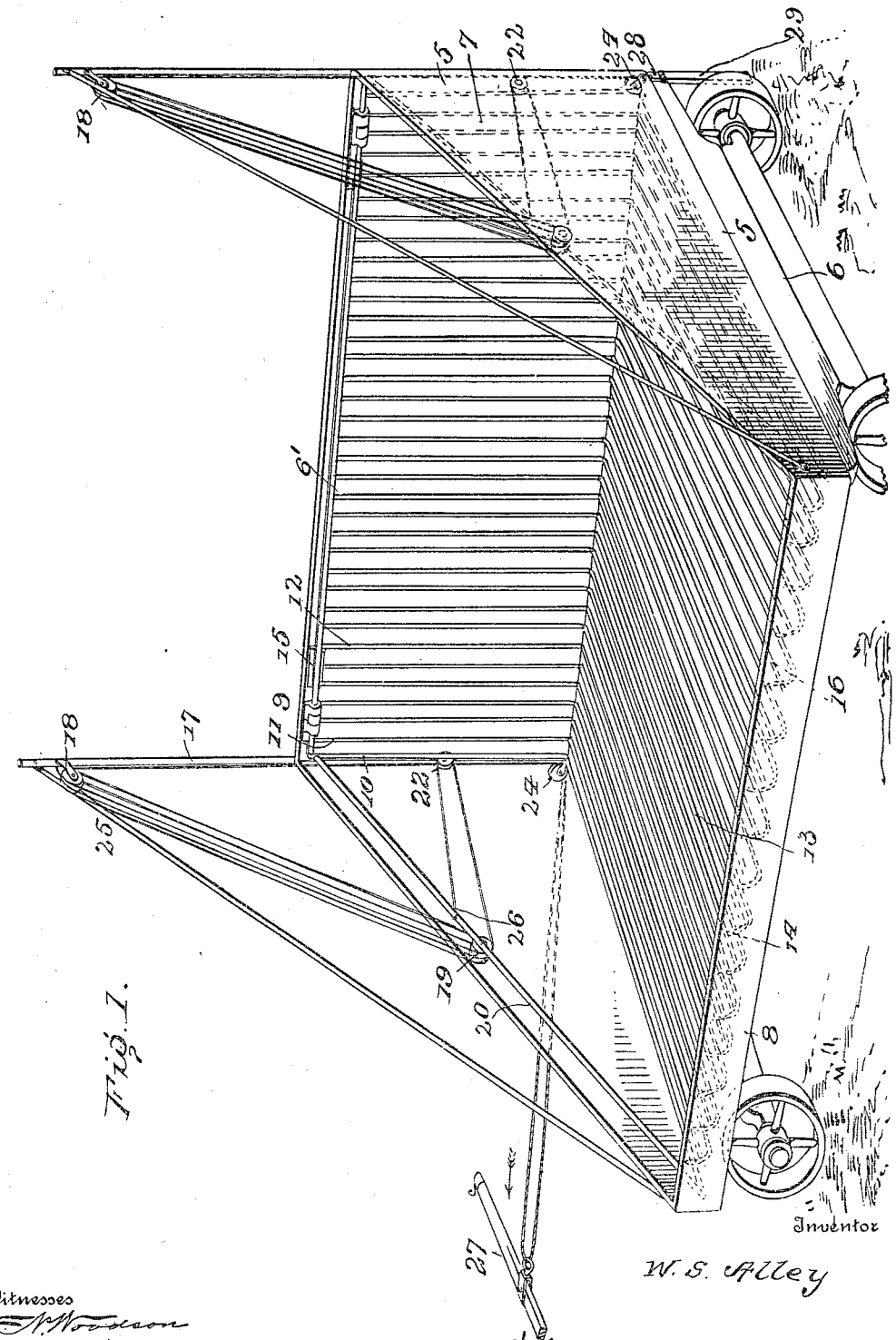

UNITED STATES PATENT OFFICE.

WILLIAM S. ALLEY, OF INGALLS, KANSAS.

HEADER-BARGE.

957,483.  Specification of Letters Patent.  Patented May 10, 1910.

Application filed May 4, 1909. Serial No. 493,875.

*To all whom it may concern:*

Be it known that I, WILLIAM S. ALLEY, citizen of the United States, residing at Ingalls, in the county of Gray and State of Kansas, have invented certain new and useful Improvements in Header-Barges, of which the following is a specification.

This invention relates to harvesters and more particularly to a frame or barge for heading machines.

The object of the invention is to provide a barge or frame adapted to receive the cut straw or grain from a heading machine as the latter travels over a field and dump the same on the ground or stack without the necessity of employing two or more men to unload the grain in the barge with a pitch fork or other implement, in the usual manner.

A further object of the invention is to provide a barge including pivotally united frames connected through the medium of ropes or cables to a draft animal or other source of power, and adapted to swing upwardly and rearwardly to effect the dumping of the grain when a longitudinal pull is exerted on the free ends of the cables.

A further object is to so arrange the main and auxiliary frames of the barge, that an initial longitudinal pull exerted on the cables will tilt the main frame and elevate the load to a position to be discharged or dumped by the auxiliary frame when a further longitudinal pull is exerted on said cables.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a perspective view of a hay frame or barge constructed in accordance with my invention, showing the parts in normal position. Fig. 2 is a transverse vertical sectional view of Fig. 1. Fig. 3 is a similar view showing the auxiliary frame ready to dislodge or dump the grain or straw from the main frame.

Corresponding and like parts are referred to in the following description and indicated in all the views of the drawings by the same reference characters.

The improved barge or frame forming the subject matter of the present invention comprises a body portion 5 mounted on a truck 6 and adapted to be drawn along by the side of a heading machine, (not shown) for the purpose of receiving grain or straw severed by the cutting knives of said machine as the latter travels over a field, the grain in the barge being conveyed to a stack and dumped.

The front portion of the member 5 is of less height than the rear wall 6' thereof so as to permit the grain or straw to be readily delivered to the barge, the side walls 7 of the body portion being inclined downwardly and connected in any suitable manner to the front wall 8.

Disposed within the body portion 5 and pivotally mounted at 9 on the rear wall 6' thereof, is a main frame or rake 10 adapted to elevate the load and support the same in position to be dumped by the auxiliary frame 11. The main frame 10 is approximately of the same shape as the body portion 5 and is preferably formed of spaced bars 12 which lie parallel with the rear wall 6' when the several parts are in normal position, and terminate in spaced teeth or tines 13, the ends of which are curved upwardly at 14, to assist in preventing displacement of the load when the latter is moved to elevated position preparatory to dumping the same.

The auxiliary frame is also pivotally mounted on the rear wall 6', as indicated at 15, and is provided with parallel longitudinally disposed teeth 16 which rest on the bed of the body portion 5 between the teeth or tines 13 of the main frame when said frames are in position to receive the grain or straw from the heading machine.

Secured in any suitable manner to the rear wall 6', are spaced uprights or supports 17 to the upper or free ends of which are secured pulleys 18, there being similar pulleys 19 fastened to the side walls 20 of the main frame 10, as best shown in Fig. 1 of the drawings.

Journaled on the outer vertical bars of the auxiliary frame 11 are pulleys or rollers 22, there being similar pulleys 23 and 24 carried by the body portion 5 and disposed at the base of the rear wall 6' thereof.

The main and auxiliary frames are operatively connected with each other and with the body portion 5 through the medium of suitable ropes or cables 25. One end of each rope or cable is rigidly secured at 26 to the adjacent side wall 20 of the main frame 10, while the opposite end thereof passes over the adjacent pulley 22 and thence over the pulleys 19 and 18 several times, the free ends of one of the cables 25 being extended downwardly and over the pulley 24 for attachment to a draft device 27, while the free end of the other cable extends downwardly from the pulley or roller 23 and also over the roller 24 for attachment to said draft device.

The construction and arrangement of the main and auxiliary frames is such that an initial longitudinal pull exerted on the free ends of the cables 25 will elevate said main and auxiliary frames to the position shown in Fig. 3 of the drawings, a further longitudinal pull on the cables causing the teeth or tines of said auxiliary frame to pass between the teeth or tines of the main frame and forcibly eject the straw or grain from the main frame thus to effect the dumping of the load.

It will here be noted that when the draft animal is traveling in the direction of the arrow shown in Fig. 1 of the drawings, the main and auxiliary frames will be tilted upwardly and rearwardly until the pulleys 19 engage the pulleys 18 when the tilting movement of the main frame will be arrested, a further movement of the draft animal in the direction of said arrow causing the cables to exert an upward pull on the rollers or pulleys 22 thus to lift the auxiliary frame 11 and cause the teeth or tines of said frame to eject the load and dislodge any material that may adhere thereto.

Pivotally connected at 28 are supporting legs 29 adapted to bear against the ground when the barge is at rest and prevent upsetting of said barge when the main and auxiliary frames are actuated to effect the dumping of the load, these legs being so pivoted to the body portion 5 and being of such a length as to allow the free ends thereof to trail over the surface of the ground as the barge travels parallel with the heading machine during the loading of said barge.

It will of course, be understood that the main and auxiliary frames may be constructed of wood, metal, wire bars, or any other suitable material without departing from the spirit of the invention.

It will also be understood that the main and auxiliary frames may be so timed as to eject or discharge the load when the main frame reaches any desired elevation.

Having thus described the invention, what is claimed as new is:

1. A barge for heading machines including a body portion, main and auxiliary frames pivotally mounted one within the other for tilting movement on said body portion and adapted to receive the grain from the heading machine, and a connection between said frames for simultaneously elevating both frames and subsequently tilting one of the frames to effect the dumping of the load.

2. A barge for heading machines including a body portion, main and auxiliary frames pivotally mounted one within the other on the body portion and movable simultaneously to operative position to effect the dumping of the load, and cables forming a connection between said frames and provided with means for attachment to a draft animal.

3. A barge for heading machines including a body portion, main and auxiliary frames pivotally mounted on the body portion, the main frame being provided with spaced teeth terminating in curved extensions and the auxiliary frame provided with spaced teeth normally interposed between the teeth of the main frame, and a flexible connection operatively connected with both frames and provided with means for attachment to a draft animal.

4. A barge for heading machines including a body portion having spaced standards secured thereto, main and auxiliary frames pivotally mounted for swinging movement on the body portion, pulleys secured to the opposite sides of the main frame, pulleys journaled on the auxiliary frame, pulleys journaled on the upper ends of the standards, and cables extended over the several pulleys and having their inner ends fastened to the main frame and their outer ends provided with means for attachment to a draft animal.

5. A barge for heading machines including a body portion having its rear wall higher than its front wall, main and auxiliary frames pivotally mounted on the rear wall of the body portion, and a connection between said frames for elevating the same to effect the dumping of the load, the auxiliary frame being provided with teeth adapted to pass through the main frame after the latter is in elevated position, thereby to forcibly eject the material from the main frame.

6. A barge for heading machines including a body portion having its rear wall higher than the front wall thereof, main and auxiliary frames pivotally mounted for tilting movement on the rear wall of the body portion and normally resting on the bottom of said body portion, standards secured to the rear wall of the body portion and provided with terminal pulleys, pulleys secured to the opposite sides of the main frame, pulleys secured to the opposite sides of the auxiliary frame and body portion respectively, and cables passing around the several pulleys and having their inner ends permanently secured to the main frame and their outer ends provided with means for attachment to a draft animal.

In testimony whereof I affix my signature in presence to two witnesses.

WILLIAM S. ALLEY. [L. S.]

Witnesses:
R. J. GODDARD,
JOSEPH E. BYRNE.